United States Patent [19]
Katayama et al.

[11] Patent Number: 6,023,326
[45] Date of Patent: Feb. 8, 2000

[54] SURVEYING SYSTEM

[75] Inventors: Yasutaka Katayama; Kazuaki Kimura; Jun Sasagawa; Kazushige Koshikawa, all of Tokyo, Japan

[73] Assignee: Kabushiki Kaisha Topcon, Tokyo, Japan

[21] Appl. No.: 08/820,653

[22] Filed: Mar. 18, 1997

[30]   Foreign Application Priority Data

Mar. 18, 1996  [JP]  Japan ................................. 8-060664

[51] Int. Cl.[7] ............................. G01B 11/26; G01C 5/00
[52] U.S. Cl. ........................................... 356/141.3; 33/290
[58] Field of Search ............................ 356/141.1, 141.3, 356/141.5, 139.07, 4.01; 364/556; 33/290

[56]             References Cited

U.S. PATENT DOCUMENTS

| | | | |
|---|---|---|---|
| 4,820,041 | 4/1989 | Davidson et al. | 356/1 |
| 4,830,489 | 5/1989 | Cain et al. | 356/73 |
| 5,055,666 | 10/1991 | Miyahara | 250/206.1 |
| 5,313,409 | 5/1994 | Wiklund et al. | 364/556 |

FOREIGN PATENT DOCUMENTS

| | | |
|---|---|---|
| 5-322570 | 12/1993 | Japan . |
| 7-83658 | 3/1995 | Japan . |

*Primary Examiner*—Mark Hellner
*Attorney, Agent, or Firm*—Foley & Lardner

[57]             ABSTRACT

A surveying system comprises a surveying machine (11) which is disposed at a reference point (A) and a reflecting mirror (5) which is disposed on the side of a target point (B). In this surveying system, a signal-light projecting device (16) for projecting a beam of signal light (P3) onto the surveying machine (11) is disposed on the side of the target point (B), and a rough-direction detecting device (20) for detecting roughly a direction in which the signal-light projecting device (16) is located by receiving the beam of signal light (P8), and a precise-direction detecting device (21) for detecting precisely the direction in which the signal-light projecting device (16) is located by receiving the beam of signal light (P3) are disposed on the side of the surveying machine (11).

5 Claims, 8 Drawing Sheets

SURVEYING SYSTEM

BACKGROUND OF THE INVENTION

1. Field of the Invention

This invention relates to improvements in a surveying system for making a survey by operating a surveying machine by remote control.

2. Description of the Prior Art

A surveying system for making a survey comprises, for example, a surveying machine which is disposed at a reference point, and a reflecting mirror (e.g., a corner cube) as a collimation target which is disposed at a target point collimated by the surveying machine. Generally, the surveying machine used for the surveying system is to process a surveyed distance and a surveyed angle electrically. There are a manual operative type of surveying machine, an automatic surveying machine driven by a motor so as to be rotated horizontally and vertically, an automatic tracking type of surveying machine which has a function of projecting a beam of scanning light and tracking a reflecting mirror as a target point, and the like.

In a survey, there are a case in which a collimation target is caused to coincide with a target point collimated by the surveying machine and a case in which the surveying machine collimates the collimating target disposed at the target point. In these cases, some surveying machines include a point setting device in order that an operator at the target point can discern the surveying machine disposed at a reference point. The point setting device emits point setting beams of light each of which has a different luminous color depending upon right and left positions (or up, down, right, and left positions), or a middle position, so that a direction in which the surveying machine collimates can be indicated roughly.

In a survey made by the manual operative type of surveying machine, an operator on the side of the reference point operates the surveying machine and searches the reflecting mirror as the collimation target disposed at the target point In the case in which the collimation target is caused to coincide with the target point collimated by the surveying machine, a survey is made while an operator on the side of the surveying machine is communicating by wireless with an operator on the side of the collimation target, or rough positioning is first made by the point setting beams of light and thereafter a survey is made while the operators are communicating by wireless with each other.

Likewise, in the case of the automatic surveying machine, almost the same collimating operation is performed as in the case of the manual operative type machine. However, in addition, the automatic surveying machine can be operated by radio or the like from the side of the target point by using the point setting beams of light. In the automatic surveying machine which is provided with a guide laser device for projecting a guide laser beam which is coincident with the collimation direction, the target point can be caused to coincide with the collimation target. Therefore, the operator is not necessarily required to be stationed on the side of the surveying machine. A surveying system by the use of this automatic surveying machine is shown in FIG. 10.

Figure 10:
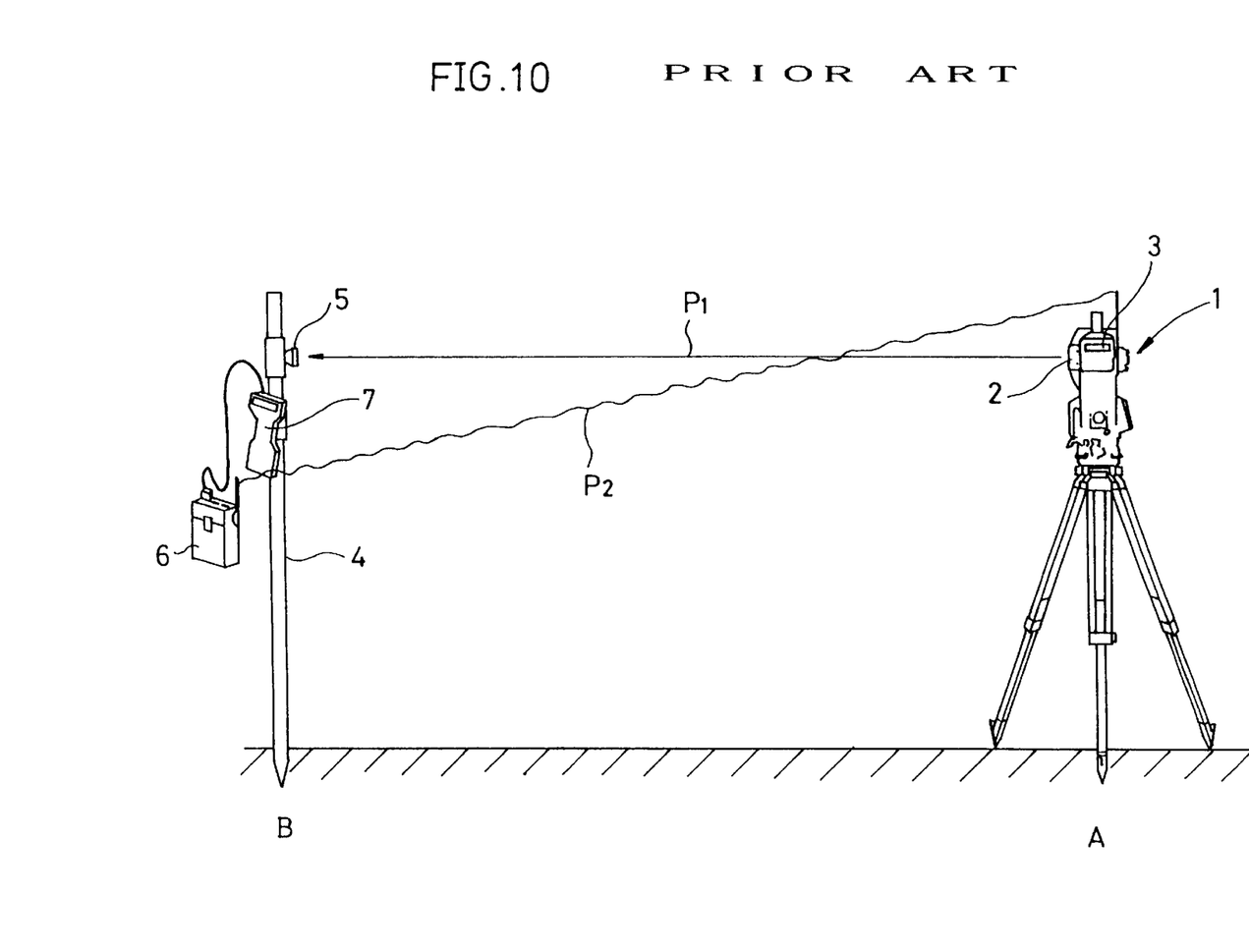
FIG. 10 is a schematic view of au example of a conventional surveying system.

In FIG. 10, reference character 1 denotes a surveying machine, 2 denotes a telescope portion, and 3 denotes a wireless communications apparatus. The surveying machine 1 is laid on a reference point A. The surveying machine 1 emits a beam of light P1 which is used for measuring a distance at a target point B. A collimation axis; of the telescope portion 2 is made coaxial (or parallel) with the distance-measuring light beam P1. The surveying machine 1 is capable of measuring a horizontal angle and a vertical angle with a zero position, and has an automatic rotational mechanism by which the rotation in horizontal and vertical directions can be made automatically (with respect to a detailed construction of the automatic rotational mechanism, see Japanese Patent Application No. Hei 4-131078, for example). Herein, the rotation in the horizontal direction means that the rotation is made on the horizontal plane, and the rotation in the vertical direction means that the rotation is made on the vertical plane.

A pole 4 is stood at a target point B. A reflecting mirror 5 is attached to the pole 4 and, in addition, a wireless communications apparatus 6 and a control device 7 having a memorizing function are attached thereto. The reflecting mirror 5 disposed at the target point B is made coincident with the collimation axis of the telescope portion 2 of the surveying machine 1, and thereby the distance and the angle from the surveying machine 1 to the target point B can be measured by the surveying machine 1. The control device 7 is used for controlling the surveying machine 1 via the wireless communications apparatus 3. 6 and, in addition, for recording and reading the result of measurement made by the surveying machine 1 on the side of the target point B. The automatic cracking type of surveying machine enables labor saving in comparison with the aforementioned automatic surveying machine. That is, the collimation target is caused to roughly coincide by, for example, the point setting device, and thereafter the reflecting mirror of the target point is located by the scanning light emitted from the tracking type of surveying machine for collimation.

The point setting beam of light is used to cause the collimation axis of the telescope portion 2 to coincide with the reflecting mirror 5. Thus, it is preferable to lay the telescope portion 2 of the surveying machine 1 substantially within eyeshot. However, in a case in which a distance from the reference point A to the target point B is too long to discern the telescope portion 2 of of the surveying machine 1 with the naked eye, it is impossible to predict which direction the point setting beam of light will reach the target point B from. This makes it difficult to cause the collimation axis of the telescope portion 2 to coincide with the reflecting mirror 5.

A surveying system by the use of the tracking type of surveying machine has a great advantage in a case in which a plurality of predetermined target points B are repeatedly measured with the condition that obstructions do not lie between the reference point A and the target points B and that the pole 4 erected at the target point B is moved slowly. On the other hand, this system has a disadvantage in a case in which a plurality of target points are marked and in a case in which the pole 4 is moved. The reason is that the reflecting mirror must be automatically tracked. Therefore, if the travel of the tracking beam is obstructed by the passage of vehicles or persons between the reference points A and the target points B or if the travel thereof is obstructed by obstructions, such as trees or buildings, when the pole is moved to change the position of the target point B, the automatic surveying machine will lose sight of the reflecting mirror 5. As a result, the automatic surveying machine has a reflecting-mirror search mode (a mode of searching for a reflecting-mirror) in which the automatic surveying machine searches a very large range. Accordingly, much time is required to search the reflecting mirror 5.

Likewise, in a case in which the automatic surveying machine is controlled by sending out or receiving an operation starting or stopping signal by means of a wireless wave P2 by the use of the wireless communications apparatus 3, 6, it is difficult to cause the collimation of the telescope portion 2 to coincide with the reflecting mirror 5 when the distance from the reference point A to the target point B is too long to discern the surveying machine 1. Additionally, the frequency and output power of the wireless communications apparatus 3, 6 are required to be varied in every country in the world because each country has its own regulations on the wireless wave P2.

SUMMARY OF THE INVENTION

An object of the present invention is to provide a surveying system which is capable of directing easily an automatic surveying machine toward a target point even when the automatic surveying machine is in a direction different from the target point beyond the range within which the automatic surveying machine is detectable, and which is capable of causing the collimation axis of a telescope portion of the automatic surveying machine to coincide with the target point without being subject to the regulation in each country to the utmost even when the automatic surveying machine is positioned so far from the target point that the telescope portion cannot be discerned with the naked eye.

In order to achieve the aforementioned object, a surveying system according to an aspect of the present invention comprises a surveying machine which is disposed at a reference point and has an automatic rotational mechanism for rotating automatically a body of the surveying machine in the horizontal and vertical directions, a signal-light protecting device which is disposed on the side of a target point and projects a beam of signal tight toward the surveying machine, a rough-direction detecting device which is disposed on the side of the surveying machine body and detects roughly a direction cohere the signal-light projecting device is located by receiving the beam of signal light, a precise-direction detecting device which is disposed on the side of the surveying machine body and detects precisely a direction where the signal-light projecting device is located by receiving the beam of signal light, and a control device which is disposed on the side of the surveying machine body and controls the automatic rotational mechanism of the surveying machine according to an output detected by the rough-direction detecting device.

In order to achieve the object a surveying machine according to another aspect of the present invention comprises a surveying machine which is disposed at a reference point and has an automatic rotation mechanism for rotating automatically a machine body of the surveying machine horizontally and vertically, a signal-light projecting device which is disposed at a target point and projects a beam of signal light onto the surveying machine, rough-direction detecting devices attached to the surveying machine which face a plurality of directions in relation to surveying directions of the surveying machine, and a precise-direction detecting device attached to the surveying machine in relation to surveying directions of the surveying machine. The rough-direction detecting device roughly directs the surveying direction of the surveying machine toward the target point in accordance with reception of the signal light, and the precise-direction detecting device causes the surveying direction of the surveying machine to coincide with the target point in accordance with reception of the signal light.

According to the thus constructed surveying system, an orientation of the surveying machine body can be made approximately coincident with a direction of the signal-light projecting device because the beam of signal light is received by the rough-direction detecting device even though the automatic surveying machine is in a direction entirely different from the target point beyond the detectable range of the automatic surveying machine. After the orientation of the surveying machine body has been made approximately coincident with the direction of the signal-light projecting device, the beam of signal light is received by the precise-direction detecting device so that the orientation of the surveying machine body can be made precisely coincident with the direction of the signal-light projecting device.

Further, even in the case where the automatic surveying machine is positioned so far from the target point that a telescope portion is, difficult to be observed with the naked eye, the collimation axis of the telescope portion of the automatic surveying machine can be made coincident with the target point because the rough-direction detecting device and the precise-direction detecting device are provided.

Further, since a wireless communications apparatus is not used, the surveying system is not subject to the regulation on a wireless operation in each country.

DESCRIPTION OF THE PREFERRED EMBODIMENTS

Embodiments of a surveying system according to the present invention will be hereinafter described with reference to the accompanying drawings.

First Embodiment

Figure 1:
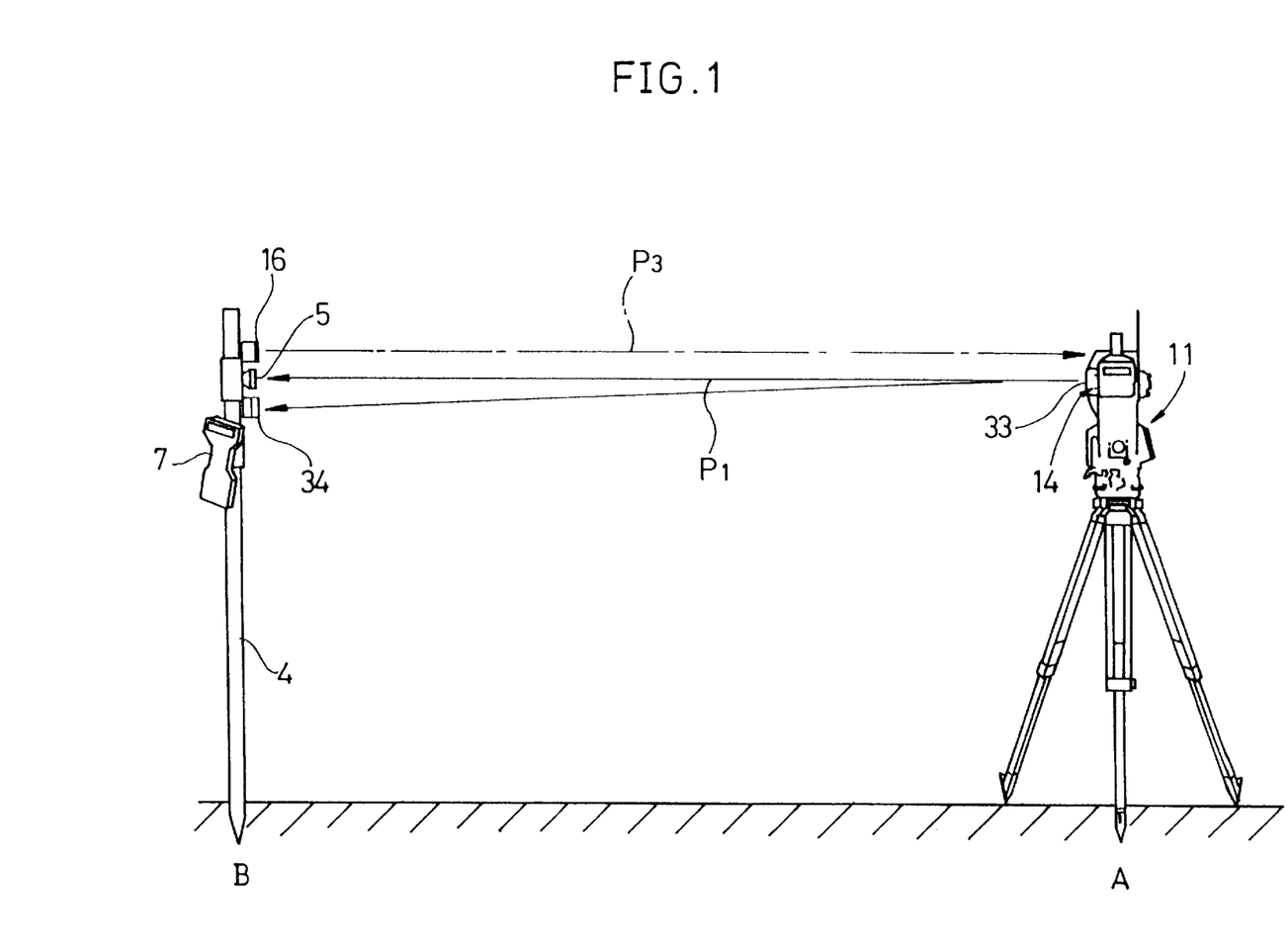
FIG. 1 is a schematic view of an example of a surveying system according to the present invention
Figure 2:
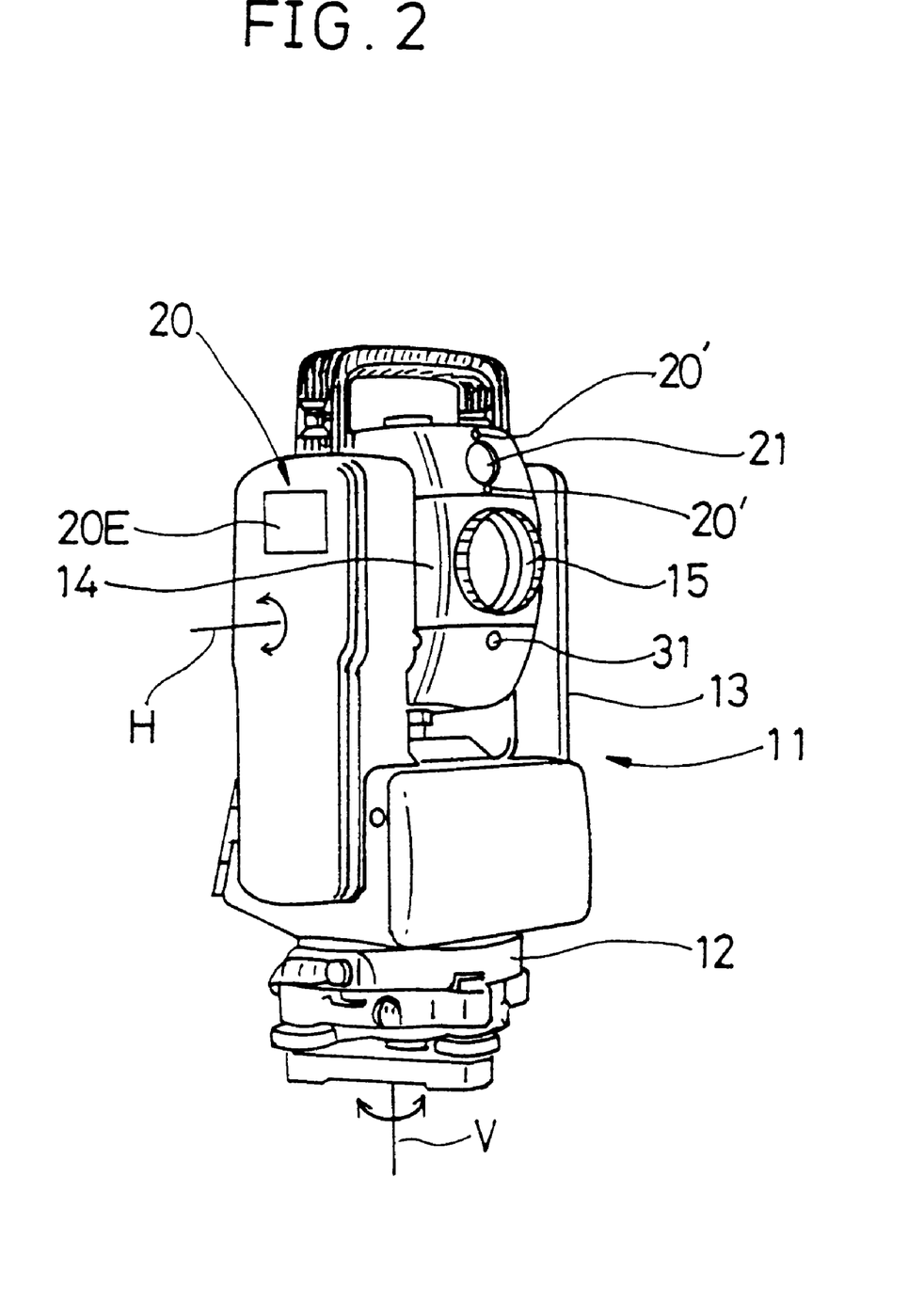
FIG. 2 is a perspective view of an example of a surveying machine according to a first embodiment of the present invention.

In FIG. 1, reference character 11 designates an automatic surveying machine disposed on a tripod. The automatic surveying machine 11 is laid at a reference point A. As shown in FIG. 2 the automatic surveying machine 11 includes a base 12, mounting portions 13 constituting a surveying machine body, and a telescope portion 14. The mounting portion 13 is rotated around a vertical axis V in a horizontal direction. The telescope portion 14 is rotated around a horizontal axis H in a vertical direction. Inside the base 12, where are disposed an automatic rotational mechanism (not shown) for rotating the mounting portion 13 in the horizontal direction and an automatic rotational mechanism (not shown) for rotating the telescope portion 14 in the vertical direction. These automatic rotational mechanisms are controlled by a CPU 24 (see FIGS. 4 and 6) which is disposed inside the mounting portion 13. The telescope portion 14 include a telescope, and reference character 15 in FIG. 2 designates an objective constituting the telescope.

The surveying machine 11 emits a beam of light P1 used for measuring a distance toward a reflecting mirror 5 (e.g a corner cube) which is attached to a pole 4 at a target paint B. The direction in which the beam of distance-measuring light P1 is emitted is correspondent with or parallel to, the optical axis of the objective 15, that is, the collimation axis of the telescope portion 14. The beam of distance-measuring light P1 is reflected by the reflecting mirror 5, and then the surveying machine 11 receives the reflected beam of light and thus measures the distance from the reference point A to the target point B. As shown in FIG. 1, a signal-light protecting device 16 for projecting a beam of signal light P3 toward the surveying machine 11 is attached to the pole 4.

Figure 3:
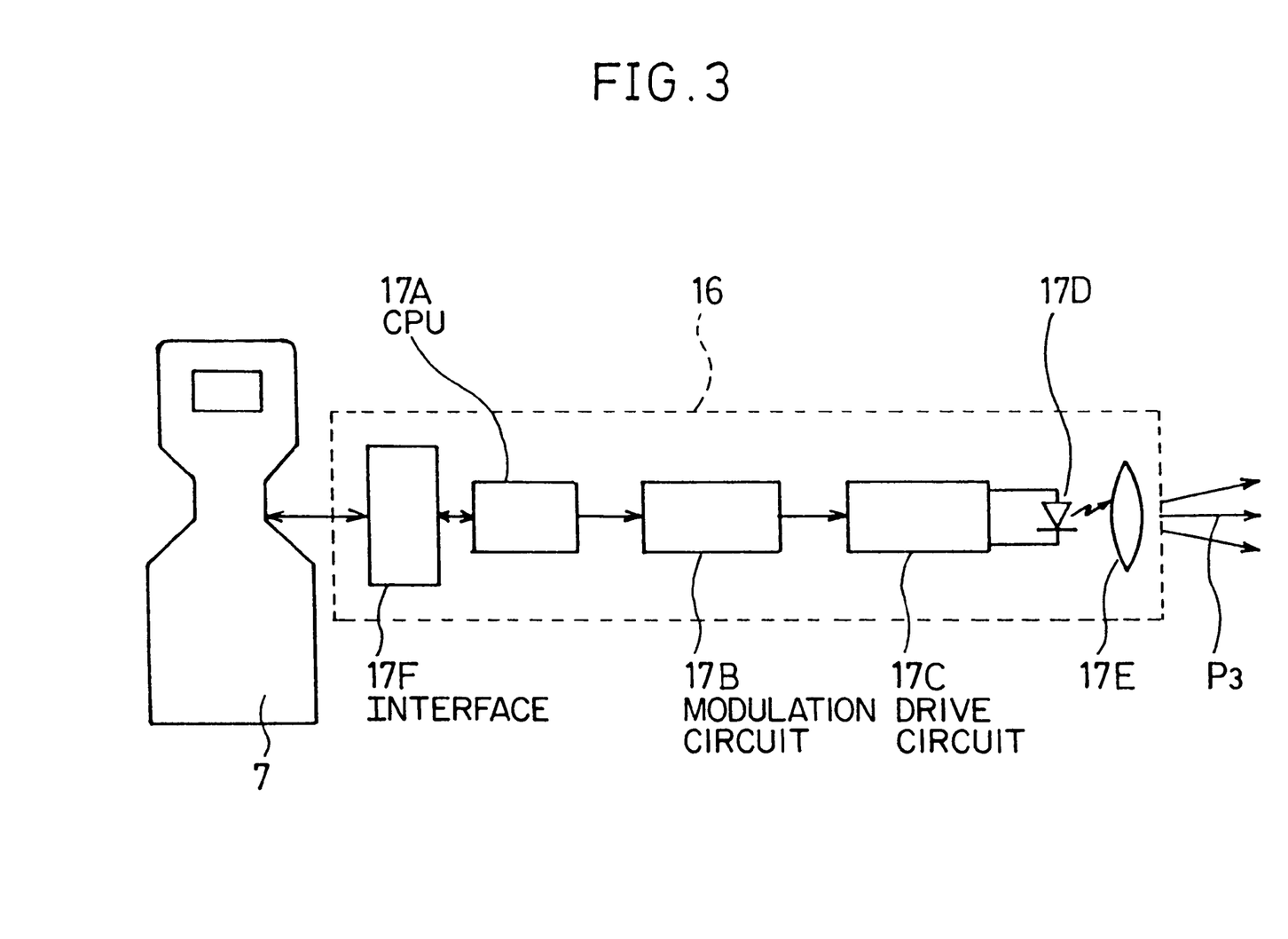
FIG. 3 is a block circuit diagram showing an example of a signal-light projecting device according to the present invention.

As shown in FIG. 3, the signal light projecting device 16 consists of a CPU 17A, a modulation circuit 17B, a drive circuit 17C, a luminescent element 17D which is turned on and off by the drive circuit 17C, a light projection lens 17E for condensing a beam of light which is set at need. The CPU 17A is controlled by a control device 7 having a memorizing function Reference character 17F designates an interface which makes a connection between the CPU 17A and the control device 7. A beam of signal light P3 is emitted radially through the light projection lens 17E. Herein, the beam of signal light P3 is composed, for example, of pulsed light.

Figure 4:
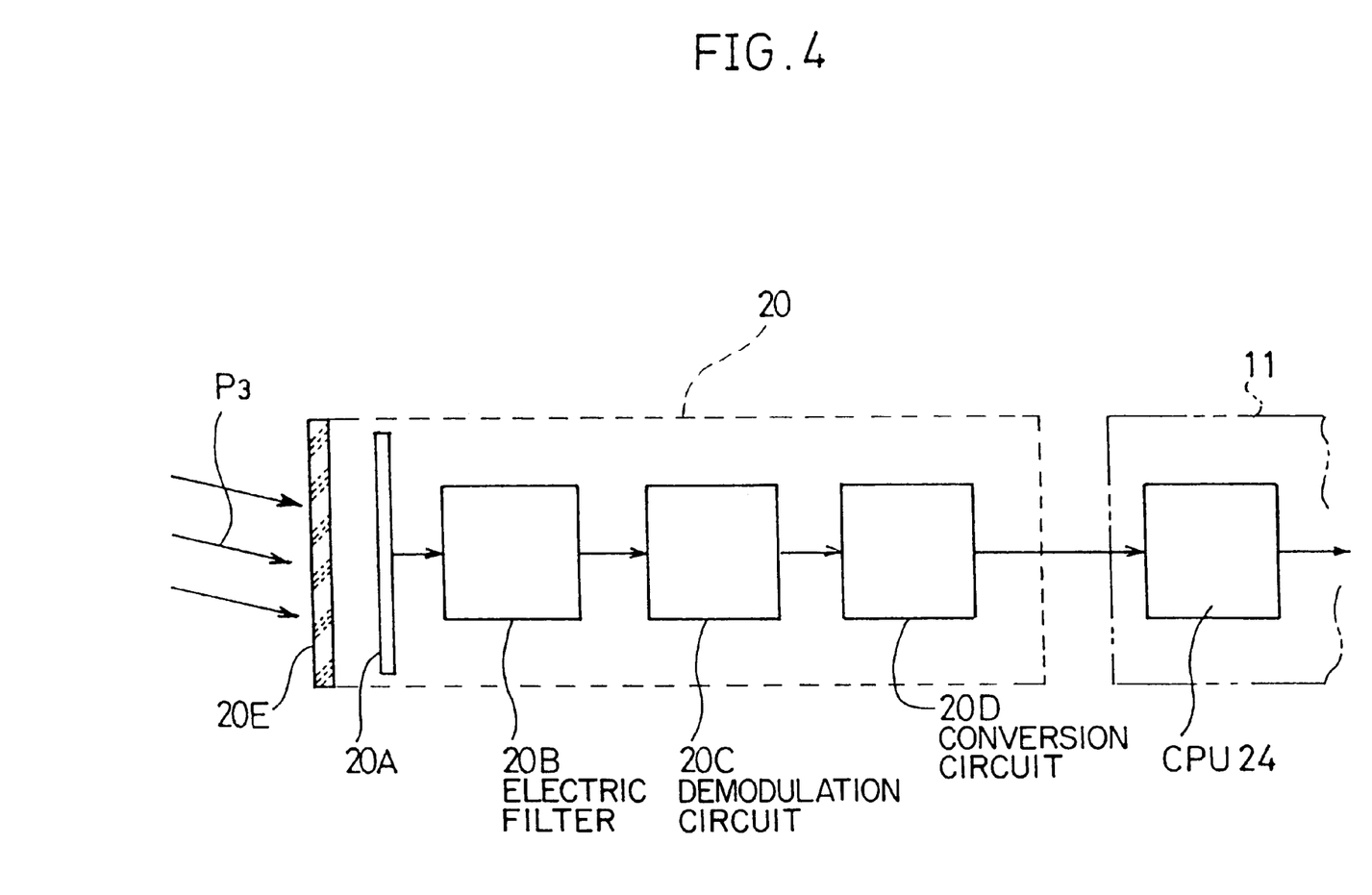
FIG. 4 is a block circuit diagram showing an example of a rough direction detecting device according to the present invention.

In the surveying machine 11 shown in FIG. 2, there are disposed rough-direction detecting devices 20 for detecting roughly a direction where the signal-light projecting device 16 is located by receiving the beam of signal light PS, and a precise-direction detecting device 21 for detecting precisely a direction where the signal-light projecting device 16 is located by receiving the beam of signal light P3. The rough-direction detecting devices 20 are disposed, for example, on the sides of the right and left mounting portions 13 and on the side of an eyepiece (not shown) of the telescope portion 14, and the precise-direction detecting device 21 is disposed on the side of the objective 15 of the telescope portion 14. As shown in FIG. 4, the rough-direction detecting portion 20 consists, upon the whole, of a light receiving window 20E, a light receiving element 20A, an electric filter circuit 20B, a demodulation circuit 20C, and an A/D conversion circuit 20D. The beam of signal light P3 is modulated and emitted from the signal-light projecting device 16, and then the beam of signal light P3 is received by the light receiving element 20A. The light receiving element 20A converts photoelectrically the beam of signal light P3, a modulated signal of the photoelectrically-converted signal is then removed by the electric filter circuit 20B, the photoelectrically-converted signal whose modulated signal has been removed is then demodulated by the demodulation circuit 20C and is converted into a digital signal by the A/D conversion circuit 20D, and thereafter is inputted in a CPU 24 of the surveying machine 11. In the rough-direction detecting portion 20, a position of the signal-light projecting device 16 is not required to be judged. In other words, all that is required for judgment is whether the beam of signal light P3 is projected or how much the beam of signal light P3 is intensive. As a consequence, an element having a comparatively simple structure can be used as the light receiving element 20A.

For example, when the rough-direction detecting device 20 in the rear of the surveying machine 11 and the rough-direction detecting device 20 in the right-hand part thereof receive the beam of signal light P3 simultaneously, the difference between the direction in which the surveying machine body is sighted and the direction of the target point at this point of time can be recognized according to the position where the rough-direction detecting device 20 has received the beam of signal light P3. The difference enables the surveying machine 11 to be directed substantially to the target point, and thus the intensity of the photoelectrically-converted signal is detected, so that the accuracy of judging what direction the beam of signal light P3 has come from can be still more heightened. When the direction in which the surveying machine body is sighted is made correspondent approximately with that of the target point B by the rough-direction detecting portion 20, the precise-direction detecting device 21 receives the beam of signal light P3.

Figure 5:
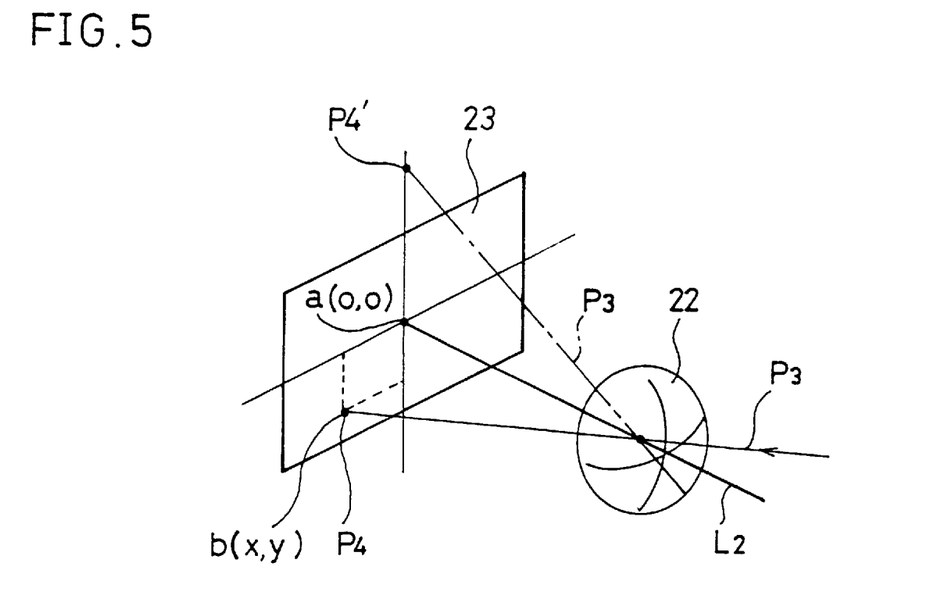
FIG. 5 is an explanatory drawing showing an example of a precise-direction detecting device according to the present invention.

FIG. 5 is a schematic drawing showing a light receiving portion 21F of the precise-direction detecting device 21. In FIG. 5, reference character 22 designates a condensing lens, and 23 designates a light receiving element. The precise-direction detecting device 21 includes the same electric circuit as the rough-direction detecting device 20. The beam of signal light P3 is condensed to the light receiving element by the condensing lens 22. Herein, for example, a CCD, a PSD, a two-pieces divided type element, or a four-pieces divided type element is used as the light receiving element 23. The light receiving element 23 detects the difference between the sight direction and the direction from which the beam of signal light P3 comes. The precise-direction detecting device 21 needs such a light receiving accuracy that the surveying machine 11 can sight the target point B, and a range of a sight target to which a guide laser beam of an automatic surveying machine is projected and a scanning range of scanning light are at an angle of a few minutes. Therefore, in this embodiment, the precise-direction detecting device 21 has the accuracy of the same level as the automatic surveying machine.

Figure 6:
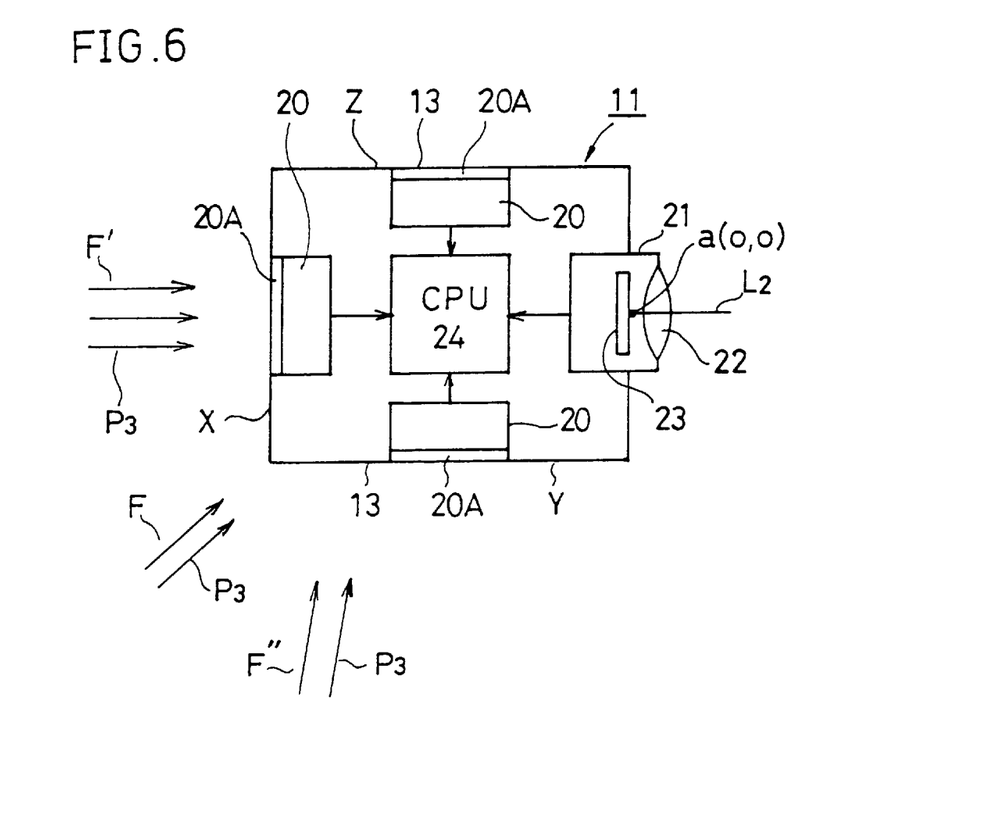
FIG. 6 is an explanatory diagram showing a function of the surveying system according to the present invention.

As shown in FIG. 5, the condensing lens 22 is disposed such that an optical axis L2 thereof is parallel to (or correspondent with) the collimation axis of the telescope portion 14. Point a at which the optical axis L2 intersects vertically the light receiving element 23 is made the origin (0, 0). First, as shown in FIG. 6, for example, when the beam of signal light P3 reaches the surveying machine 11 from a direction shown by arrow F, the beam of signal light P3 is received simultaneously the rough-direction detecting device 20 disposed at a side X of the eyepiece side and the rough-direction detecting device 20 disposed at a side Y of the mounting portions 13 and, on the other hand, the team of signal light P3 is not received by the rough direction detecting device 20 disposed at a side Z of the mounting portions 13. The output detected by each of the rough-direction detecting devices 20 id inputted to the CPU 24 of the surveying machine 11. Next, for example, when the beam of signal light P3 reaches the surveying machine 11 from a direction shown by arrow F'. the beam of signal light P3 is received only by the rough-direction detecting device 20 disposed at the side X. Further, for example, when the beam of signal light P3 reaches the surveying machine 11 from a direction shown by arrow F'''. the received-light output of the rough-direction detecting device 20 disposed at the side Y becomes higher than that of the rough-direction detecting device 20 disposed at the aide X. The CPU 24 outputs instructions to rotate the surveying machine 11 horizontally, depending on whether there is any received-light output of the rough-direction detecting device 20 disposed at each of the sides X, Y, and Z, and according to the difference in value among each of the received-light outputs, so that the objective 15 of the surveying machine 11 is turned approximately to a direction from which the beam of signal light P3 comes.

In FIG. 6, when the beam of signal light P3 reaches the surveying machine 11 from the direction of arrow F and the surveying machine 11 is rotated horizontally, the objective 15 is turned approximately to the direction from which the beam of signal light P3 comes. Thereby, as shown in FIG. 5, the beam of signal light P3 comes within the range of the condensing lens 22 of the precise-direction detecting device 21, an optical point P4 of the beam of signal light P3 is formed on the light receiving element 23. The position where the optical point P4 is formed is defined as, for example, a coordinate value b(x,y). The control device 24 rotates the surveying machine body horizontally and vertically according to the coordinate value b(x, y), so that the coordinate value b(x, y) becomes a coordinate values b(0, 0). Thereby, the direction from which the beam of signal light P3 comes can be caused to coincide with the optical axis L2.

In the automatic surveying machine 11 shown in the first embodiment, the precise-direction detecting device 21 is disposed above the objective 15. Accordingly, for example, when the telescope portion 14 is difficult to receive the beam of signal light P3 because it faces upward, as shown in FIG. 5, an optical point P4' is formed at a position away from the light receiving element 23, which results in a state where the beam of signal light P3 is difficult to be received. In order to avoid this state, the telescope portion 14 may be constructed to rotate at regular intervals in the vertical direction, Additionally, a construction may be employed in which the rough-direction detecting devices are disposed on both up and down sides between which the light receiving element 23 is disposed, or the rough-direction detecting devices 20' are disposed on both sides between which the precise-direction detecting device 21 of the telescope portion 14 is disposed.

Second Embodiment

Figure 7:
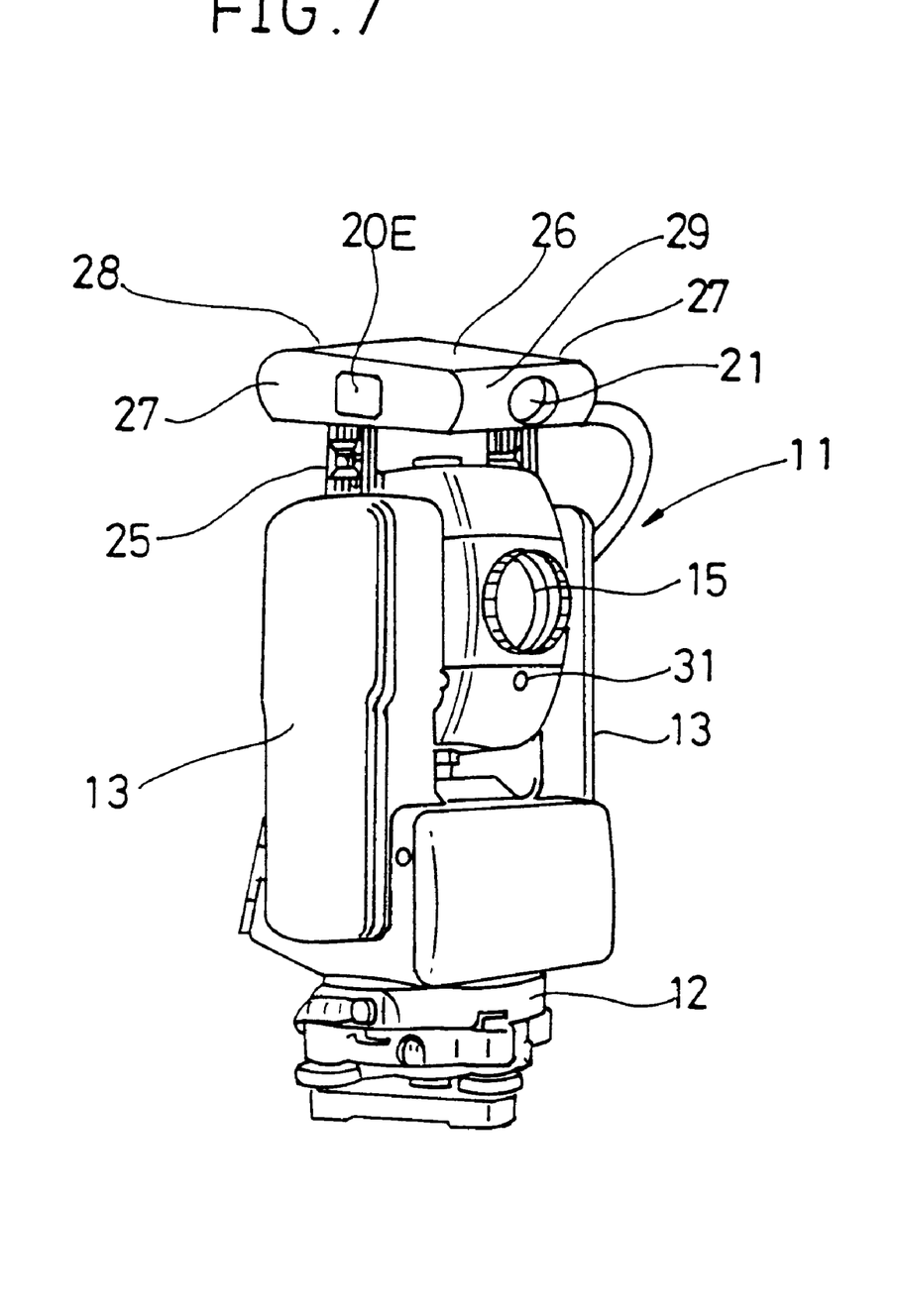
FIG. 7 is a perspective view of another example of a surveying machine according to a second embodiment of the present invention.

FIG. 7 shows a second embodiment. In the second embodiment, a handle portion 25 is attached to the upper part of each of mounting portions 13 of a surveying machine body, and a box-shaped body 26 is attached to the handle portion 25. Rough-direction detecting devices 20 are disposed on both sides 27 and the rear side 28 of the box-shaped body 26, and a precise-direction detecting device 21 is disposed on the front side 29 of the box-shaped body 26. According to this construction, a surveying system of the present invention can be realized without varying the surveying machine 11 to a large extent.

In the second embodiment, the rough-direction detecting devices 20 and the precise-direction detecting device 21 are disposed above the mounting portions 13, and thereby movements in up and down directions are limited in comparison with the integrally-formed type of automatic surveying machine 11 (see FIG. 2) shown in the first embodiment. For example, in the case where the beam of signal light P3 reaches the surveying machine 11 from an oblique upper part or in oblique lower part in the vertical direction, a light-receiving area becomes smaller apparently, and thereby the output of a photoelectrically-converted signal becomes relatively small in comparison with that in the case where the beam of signal light P3 comes from the horizontal direction. Especially in the case where the beam of signal light P3 comes from the vertically oblique upper direction, in the same way as described in the first embodiment, an optical point P4 is formed at a position away from the light receiving element 23. This makes it impossible to detect accurately the direction from which the beam of signal light P3 comes. In the case where the beam of signal light P3 comes from a right upper part or a right lower part in the vertical direction, light reception becomes difficult.

In the case where there is a possibility that the beam of signal light P3 reaches the surveying machine 11 from a right upper part or a right lower part in the vertical direction, all that have to be done is to dispose the rough-direction detecting device. 20 on the side right above or below the surveying machine 11 in the vertical direction, or to increase a condensed-light quantity by providing each of the rough-direction detecting devices 20 with a condensing lens. In short, it is required to dispose each of the rough-direction detecting devices 20 such that a dead angle does not exist. Further, a received-light quantity may be increased by disposing a plurality of rough-direction detecting devices 20 in one plane.

Figure 8:
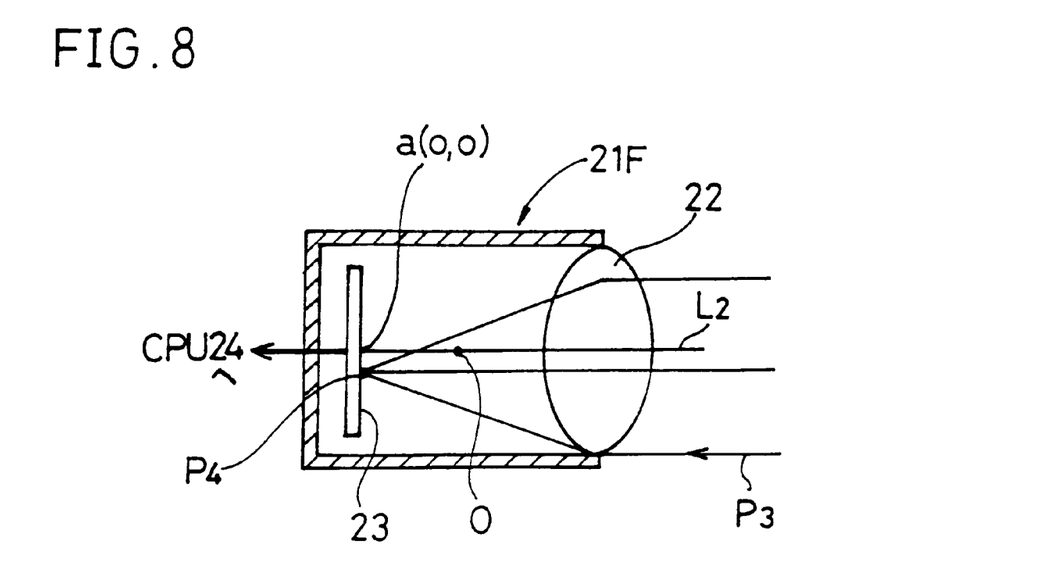
FIG. 8 is an explanatory drawing showing a modification of a precise direction detecting device according to the present invention.
Figure 9:
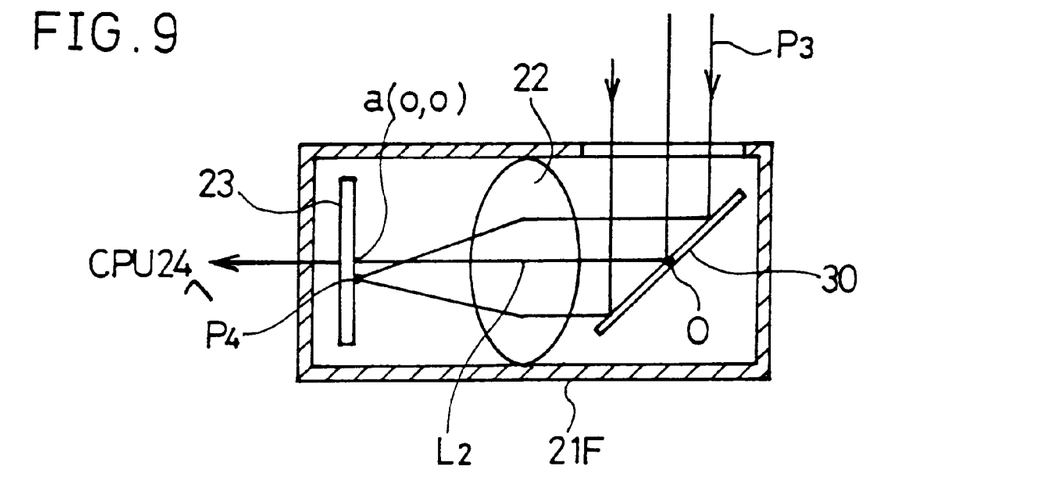
FIG. 9 is an explanatory drawing showing another modification of a precise-direction detecting device according to the present invention

As shown in FIG. 8, a light receiving portion 21F of the precise-direction detecting device 21 can be constructed to be rotatable around a rotational center O in the vertical direction. According to this construction, when the light receiving portion 21F of the precise-direction detecting device 21 is rotated such that the optical point P4 is positioned at the origin a(0, 0) of the light receiving element 23, the angle of rotation from the reference position of the light receiving portion 21F of the precise-direction detecting device 21 is measured and detected, and then the value is inputted to the CPU 24 of the surveying machine 11. Thereby, a sight axis of the surveying machine 11 can be turned in the direction from which the beam of signal light P3 comes, Further, as shown in FIG. 9, a reflecting mirror 30 which is rotatable around the rotational center O in the vertical direction can be disposed inside the light receiving portion 21F of the precise-direction detecting device 21. According to this construction, the reflecting mirror 30 is rotated in the vertical direction by a pulse motor or a motor having an encoder so that the optical point P4 is positioned at the origin $z_i(0, 0)$ of the light receiving element 23, and thus the angle of rotation from the reference position of the reflecting mirror 20 can be measured. Thereby, it becomes possible to detect accurately the direction from which the beam of signal light P3 comes, and in the same way as described in the construction in FIG. 8, the value is inputted to the CPU 24 of the surveying machine 11, so that the sight axis of the surveying machine 11 can be turned in the direction from which the beam of signal light P3 comes. Herein, an element small in area can be used as the light receiving element 28.

Pieces of control information about the surveying machine 11 can be accumulated in the beam of signal light P3. For example, if a command to turn on and off a power source of the surveying machine 11, control information about rotating the surveying machine 11 rightward and leftward in the horizontal direction, and control information about rotating the surveying machine 11 upward and downward in the vertical direction are transmitted to the surveying machine 11, the surveying machine 11 can be controlled effectively. Further, if the telescope portion 14 is provided with a point-setting-light portion 31 so that an operator can view the point light, a sighting operation can be performed with heightened accuracy.

Further, as shown in FIG. 1, according to a construction where a through-light data transmitter 33 is attached to the telescope portion 14 and a light data transmitter 34 is attached to the pole 4, according to the need, information about measurement results, and information about the surveying machine 11, such as control data, can be given to an operator on the side of the target point B. In this case, the beam of distance-measuring light P1 is used as transmission light by the light data transmitter 33, or in the case of using a tracking type of surveying machine, a beam of tracking light i used. According to this construction, a surveyed-data transmitting function can be added without complicating the construction of the surveying machine 11 to a large extent.

As explained above, this invention is constructed such that the direction from which the beam of signal light P3 comes is detected by the rough-direction detecting devices 20, the precise direction detecting device 21 is then turned to the direction, the direction is then detected accurately by the precise-direction detecting device 21, and the sight axis of the surveying machine 11 is caused to coincide with the target point B. The light receiving element 23, which is used in the case where the direction from which the beam of signal light P3 comes is detected, is not limited to a CCD for detecting a two-dimensional position. Instead, a construction may be employed in which a two-dimensional position of the optical point P4 is detected by disposing one-dimensional detecting elements in the directions perpendicular to each other. Further, a construction may be employed in which a one-dimension detecting element is disposed navy in the vertical direction. In this case, according to a result detected by the rough-direction detecting devices 20, the surveying machine 11 is rotated in the horizontal direction and is temporarily stopped its rotation immediately before the optical point P4 comes across the one-dimension detecting element, and thereafter the surveying machine 11 is rotated slowly in the same direction, and it is detected when the optical point P4 has come across the one-dimensional detecting element. Therefore, the surveying machine 11 is rotated slowly in the opposite direction from the time when it has come across the one-dimension detecting element by the rotational inertia of the surveying machine 11 and has stopped. This operation is repeated several times, and thereby, for a while, the position where the optical point P4 is imaged can be converged on the one-dimension detecting element.

What is claimed is:

1. A surveying machine having an automatic rotation mechanism for rotating automatically a machine body of the surveying machine in horizontal and vertical directions, said surveying machine comprising:

a signal-light projecting device for projecting a beam of signal light from a side of a target point toward said surveying machine which is disposed at a reference point;

a plurality of direction detecting means, contained in said machine body and disposed in a rotational direction of said machine body, for receiving the signal light projected by said signal-light projecting device and detecting a direction of the signal light;

control means for controlling a collimation direction of said surveying machine to be pointed toward said signal-light projecting device; and wherein at least one of said plurality of direction detecting means is a precise-direction detecting means for detecting more precisely the direction of the signal light.

2. A surveying machine according to claim 1, wherein said plurality of direction detecting means are disposed in a horizontally rotational direction of said machine body.

3. A surveying machine according to claim 1, wherein said plurality of direction detecting means detect a direction at least within a collimation range of a telescope of said surveying machine.

4. A surveying machine according to claim 1, wherein said plurality of direction detecting means detect a direction at least within a trackable range in a case in which said surveying machine is of an automatic tracking type.

5. A surveying machine according to claim 1, wherein said plurality of direction detecting means are each provided with a condensing lens so that a direction to be detected is not in a dead angle.

* * * * *